(12) United States Patent
Sarraf et al.

(10) Patent No.: US 7,974,255 B2
(45) Date of Patent: Jul. 5, 2011

(54) METHOD AND APPARATUS FOR MULTI-STREAM TRANSMISSION WITH TIME AND FREQUENCY DIVERSITY IN AN ORTHOGONAL FREQUENCY DIVISION MULTIPLEXING (OFDM) COMMUNICATION SYSTEM

(75) Inventors: Mohsen Sarraf, Rumson, NJ (US);
Mohammad Hossein Zarrabizadeh, Woodbridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2098 days.

(21) Appl. No.: 10/636,161

(22) Filed: Aug. 7, 2003

(65) Prior Publication Data

US 2005/0099938 A1    May 12, 2005

(51) Int. Cl.
*H04J 1/00* (2006.01)
(52) U.S. Cl. ........................................ 370/343; 370/487
(58) Field of Classification Search .................. 370/343, 370/487
See application file for complete search history.

(56) References Cited

U.S. PATENT DOCUMENTS

| | | | | |
|---|---|---|---|---|
| 5,283,780 A | * | 2/1994 | Schuchman et al. | 370/312 |
| 5,850,415 A | * | 12/1998 | Hunsinger et al. | 455/143 |
| 5,912,917 A | * | 6/1999 | Engelbrecht et al. | 375/260 |
| 5,949,796 A | * | 9/1999 | Kumar | 370/487 |
| 6,178,317 B1 | * | 1/2001 | Kroeger et al. | 455/296 |
| 6,230,022 B1 | * | 5/2001 | Sakoda et al. | 455/464 |
| 6,292,917 B1 | * | 9/2001 | Sinha et al. | 714/752 |
| 6,314,289 B1 | * | 11/2001 | Eberlein et al. | 455/10 |
| 6,347,122 B1 | * | 2/2002 | Chen et al. | 375/296 |
| 6,353,637 B1 | * | 3/2002 | Mansour et al. | 375/260 |
| 6,405,338 B1 | * | 6/2002 | Sinha et al. | 714/752 |
| 6,430,227 B1 | * | 8/2002 | Kroeger et al. | 375/260 |
| 6,430,724 B1 | * | 8/2002 | Laneman et al. | 370/498 |
| 6,452,977 B1 | * | 9/2002 | Goldston et al. | 370/204 |
| 6,985,537 B1 | * | 1/2006 | Milbar | 375/265 |
| 7,085,377 B1 | * | 8/2006 | Norr | 370/485 |

* cited by examiner

*Primary Examiner* — Ricky Ngo
*Assistant Examiner* — Phuongchau B Nguyen
(74) *Attorney, Agent, or Firm* — Ryan, Mason & Lewis, LLP

(57) ABSTRACT

A method and apparatus increase the time and frequency diversity of a multi-stream signal in a DAB system. A plurality of audio streams are divided into four (4) digital sub-streams, $C_{00}$, $C_{01}$, $C_{10}$, and $C_{11}$. Each sub-stream $C_{00}$, $C_{01}$, $C_{10}$, and $C_{11}$ is assigned a unique frequency band, and time slot. A first core sub-stream $C_{10}$ is mapped to one frequency partition and a second core sub-stream $C_{00}$ is mapped to another frequency partition and delayed relative to the first core sub-stream. Similarly, two enhancement sub-streams $C_{11}$ and $C_{01}$ are mapped to different frequency partitions and are time delayed relative to each other and the core sub-streams. The two core sub-streams $C_{00}$ and $C_{10}$ can have a maximum separation across both the time and frequency axes.

18 Claims, 3 Drawing Sheets

METHOD AND APPARATUS FOR MULTI-STREAM TRANSMISSION WITH TIME AND FREQUENCY DIVERSITY IN AN ORTHOGONAL FREQUENCY DIVISION MULTIPLEXING (OFDM) COMMUNICATION SYSTEM

FIELD OF THE INVENTION

The present invention relates generally to digital audio broadcasting (DAB) and other types of digital communication systems, and more particularly, to techniques for overcoming channel impairments in such digital audio broadcasting and other types of digital communication systems.

BACKGROUND OF THE INVENTION

Proposed systems for providing digital audio broadcasting in the FM radio band are expected to provide near CD-quality audio, data services and more robust coverage than existing analog FM transmissions. However, until such time as a transition to all-digital DAB can be achieved, many broadcasters require an intermediate solution in which the analog and digital signals can be transmitted simultaneously within the same licensed band. Such systems are typically referred to as hybrid in-band on-channel (HIBOC) DAB systems, and are being developed for both the FM and AM radio bands.

In order to prevent significant distortion in conventional analog FM receivers, the digital signal in a typical FM HIBOC DAB system is, for example, transmitted in two side bands, one on either side of the analog FM host signal, using orthogonal frequency division multiplexing (OFDM) sub-carriers. In an OFDM communication system, the digital signal is modulated to a plurality of small sub-carrier frequencies that are then transmitted in parallel.

In the United States, the frequency plan established by current FCC regulations separates each transmitting station in a geographical area by 800 KHz. Any transmitting stations in adjacent geographical areas, however, are separated from a local transmitting stations by only 200 KHz. Thus, a particularly significant source of interference in such a system is known as first adjacent analog FM interference. This interference results when a portion of a FM host carrier in an adjacent geographic area overlaps in frequency with a portion of a digital signal side band. Although first adjacent analog FM interference, when present, typically affects only one of the two digital side bands, it nonetheless represents a limiting factor on the performance of DAB systems. The presence of a strong first adjacent interference signal will significantly degrade the performance of the digital signal transmissions, even when one of the two side bands is free from interference.

An FM channel suffers from dispersion in both the time and frequency domains. In the time domain, severe multiple path propagation can yield a delay spread ranging from 3 to 30 microseconds in urban and suburban environments. Such a delay spread range corresponds to a channel coherence frequency range of 30 to 300 kHz, which can be comparable to the signal bandwidth at the upper limit and causes flat fades for channels exhibiting low delay spread, such as in a dense urban environment. In the frequency domain, a slow moving vehicle may experience a frequency dispersion of 0.2 Hz while a fast moving vehicle may experience a frequency dispersion of 15 Hz. For static channels, such as a slow moving vehicle, the channel varies slowly in time and as such, time diversity schemes alone cannot combat various channel impairments such as selective and flat fading conditions.

A need therefore exists for a multi-stream transmission system that exhibits both time and frequency diversity. A further need exists for a method and apparatus that diversifies a PAC signal across both the time and frequency domains within the allocated bandwidth and time delay.

SUMMARY OF THE INVENTION

Generally, a method and apparatus are disclosed for increasing the time and frequency diversity of a multi-stream signal in a DAB system. A plurality of audio streams are divided into four (4) digital sub-streams, $C_{00}$, $C_{01}$, $C_{10}$, and $C_{11}$. In one implementation, two sub-streams, $C_{00}$ and $C_{10}$, are core streams, and two sub-streams, $C_{01}$ and $C_{11}$, are enhancement streams. According to one aspect of the invention, each sub-stream $C_{00}$, $C_{01}$, $C_{10}$, and $C_{11}$ is assigned a unique frequency band, and a unique time slot relative to the other sub-streams.

A first core sub-stream $C_{10}$ is mapped to one frequency partition and a second core sub-stream $C_{00}$ is mapped to another frequency partition and delayed relative to the first core sub-stream. Similarly, two enhancement sub-streams $C_{11}$ and $C_{01}$ are mapped to different frequency partitions and are time delayed relative to each other and to the core sub-streams. According to one aspect of the present invention, no two sub-streams associated with the same audio segment are transmitted in the same time slot.

In an all-digital in-band on-channel digital audio broadcasting system implementation, the two core sub-streams $C_{00}$ and $C_{10}$ can have a maximum separation across both the time and frequency axes. In addition, the present invention permits each core sub-stream $C_{00}$ and $C_{10}$ in an all-digital IBOC system to have a maximum separation from one of the enhancement sub-streams in the frequency domain and a maximum separation from the other enhancement sub-stream in the time domain. In the illustrative implementation, there is a one-second time delay between each core sub-stream and its corresponding enhancement sub-stream.

At the receiver, each core sub-stream $C_{00}$ and $C_{10}$ can be combined with any other available core or enhancement sub-stream to form a 64 kbps PAC. In addition, a 96 kbps PAC can be obtained by combining the two core sub-streams $C_{00}$ and $C_{10}$ with one of the enhancement sub-streams $C_{01}$ or $C_{11}$. Finally, the combination of all four sub-streams produces a full-rate 128 kbps PAC.

A more complete understanding of the present invention, as well as further features and advantages of the present invention, will be obtained by reference to the following detailed description and drawings.

DETAILED DESCRIPTION

Figure 1:
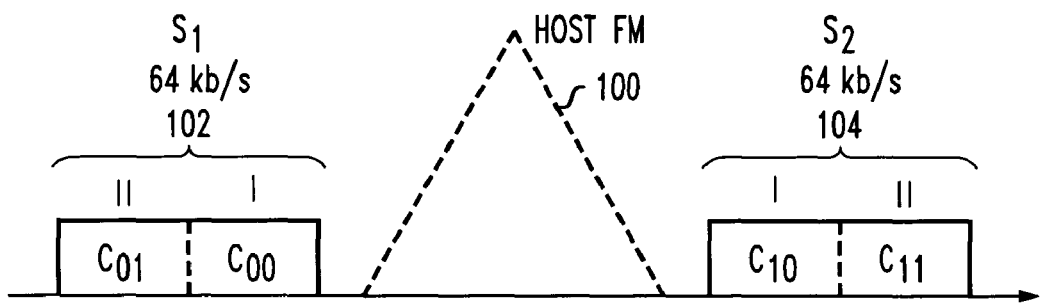
FIG. 1 shows a portion of a frequency spectrum in an exemplary hybrid in-band on-channel digital audio broadcasting system in accordance with the present invention.

FIG. 1 illustrates a portion of a frequency spectrum in an exemplary FM hybrid IBOC DAB system, plotted with the power, P, as a function of frequency, f. The portion of the spectrum shown in FIG. 1 includes an analog host FM signal 100 with associated lower digital side band 102 and upper digital side band 104. The side bands represent portions of the frequency spectrum used to transmit digital audio information in the HIBOC DAB system.

In the spectrum of FIG. 1, OFDM sub-carriers are spread uniformly across the digital side bands 102, 104 of the channel with equal power. In the illustrative implementation, the side bands 102, 104 represent portions of the frequency spectrum used to transmit four (4) digital sub-streams of 32 kbps, namely, $C_{00}$, $C_{01}$, $C_{10}$, and $C_{11}$, in a multi-stream environment. The two sub-streams $C_{00}$ and $C_{10}$ are considered to be the core streams, while the two sub-streams $C_{01}$ and $C_{11}$ are regarded as the enhancement to the two core sub-streams $C_{00}$ and $C_{10}$ respectively.

It is noted that the enhancement sub-streams $C_{01}$ and $C_{11}$ are most likely to suffer from first adjacent FM interference. Thus, in the frequency allocation shown in FIG. 1, the more important core sub-streams $C_{00}$ and $C_{10}$ are positioned near the analog host FM signal 100, to protect against the effects of the interference expected in this portion of the frequency spectrum. Thus, the present invention provides frequency diversity to protect the more important components of a digital signal from first adjacent FM interference. In addition, as discussed below in conjunction with FIGS. 3 and 4, the present invention also provides time diversity to protect against a fading channel.

In the exemplary FM HIBOC DAB system of FIG. 1, an audio signal is first encoded using a multi-descriptive coding technique to produce two streams $S_1$ and $S_2$. The streams $S_1$ and $S_2$ are transmitted on host FM signal 100 as side-bands 102 and 104, respectively. The transmission of multi-descriptive streams $S_1$ and $S_2$ in different frequency bands provides both time and frequency diversity.

The two streams $S_1$ and $S_2$ are then each divided into two classes, $C_{00}$, $C_{01}$, $C_{10}$, and $C_{11}$, using a bit stream classifier. Performance gains are obtained from this type of error protection by exploiting interference variations across the side bands. The system in the illustrative embodiment uses an inner cyclic redundancy code (CRC), and differential quadrature phase shift keyed (DQPSK)/OFDM modulation to encode sub-bands $C_{00}$, $C_{01}$, $C_{10}$, and $C_{11}$. This arrangement results in a total of four different bitstreams.

The DQPSK modulation of transmitted symbols provides robustness to frequency-selective fading and oscillator phase drift. The differential encoding is performed in frequency between OFDM tones. The digital signal to be transmitted and the outer CRC block code to be transmitted in each of the side bands 102, 104 are different classes of the PAC encoder and are transmitted in such a manner that each side band 102, 104 can be decoded independent of the other side. Each of the side bands can include N components (not shown) that may represent, for example, sets of orthogonal frequency division multiplexed (OFDM) sub-carriers. A PAC audio coder can generate an encoded audio signal, for example, at a bit rate of 96 kbps using the audio compression techniques described, for example, in D. Sinha, J. D. Johnston, S. Dorward and S. R. Quackenbush, "The Perceptual Audio Coder," in Digital Audio, Section 42, pp. 42-1 to 42-18, CRC Press, 1998, incorporated by reference herein. For a more detailed discussion of a conventional orthogonal frequency division multiplexing (OFDM) system, see, for example, W. Y. Zou and Y. Wu, "COFDM—An Overview," IEEE Trans. Broadcasting, Vol. 41, No. 1, 1-8 (March 1995) or J. A. C. Bingham, "Multicarrier Modulation for Data Transmission: An Idea Whose Time Has Come," IEEE Comm., 5-14 (May 1990), each incorporated by reference herein.

Figure 2:
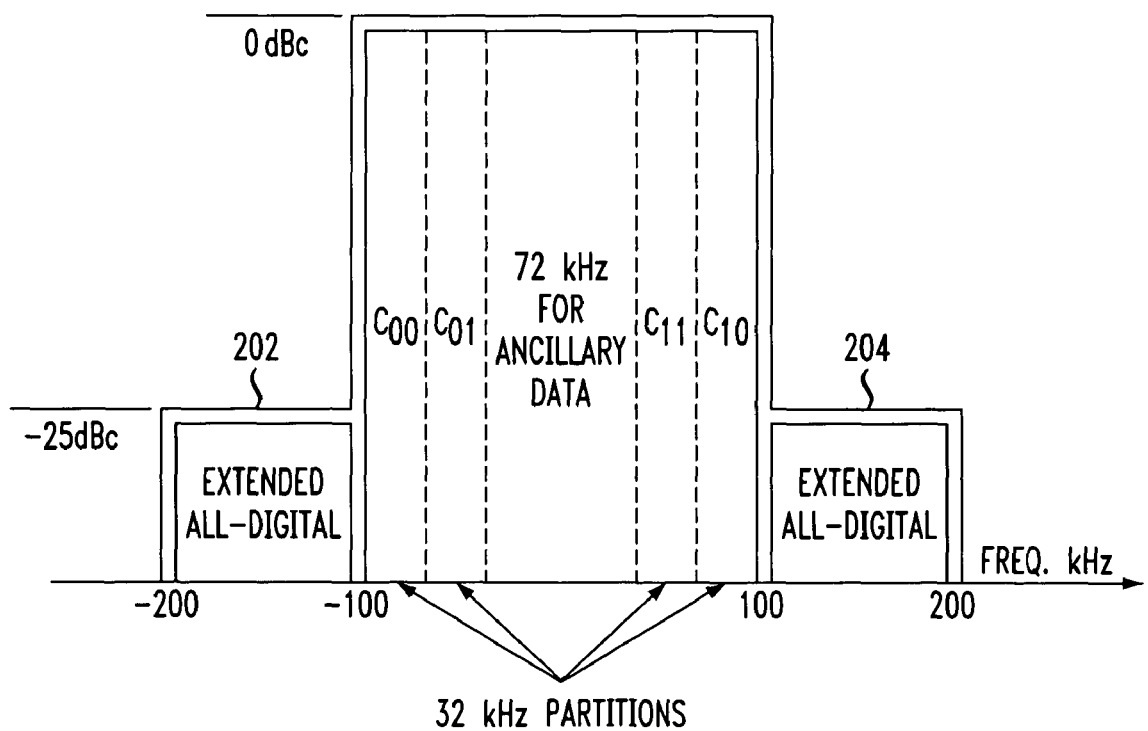
FIG. 2 shows a portion of a frequency spectrum in an exemplary all-digital in-band on-channel digital audio broadcasting system in accordance with the present invention.

FIG. 2 illustrates a portion of a frequency spectrum in an alternate, exemplary all-digital FM IBOC DAB system, plotted with the power, P, as a function of frequency, f. In the spectrum of FIG. 2, OFDM sub-carriers are spread uniformly across the channel with equal power, except for optional side band sub-carriers in two 100 KHz side bands 202, 204, which are generally 25 dB weaker in the illustrative OFDM implementation. The side bands 202, 204 represent portions of the frequency spectrum used to transmit optional digital information or data services in the IBOC DAB system.

In both the HIBOC implementation of FIG. 1 and the all-digital implementation of FIG. 2, the multi-stream PAC format produces four (4) digital sub-streams of 32 kbps, namely, $C_{00}$, $C_{01}$, $C_{10}$, and $C_{11}$, which are illustratively assigned to the four frequency intervals as shown in FIGS. 1 and 2. The two sub-streams $C_{00}$ and $C_{10}$ are considered the core streams, while $C_{01}$ and $C_{11}$ are regarded as the enhancement to $C_{00}$ and $C_{10}$ respectively Each core sub-stream $C_{00}$ and $C_{10}$ can be combined with any other available core or enhancement sub-stream to form a 64 kbps PAC. In addition, a 96 kbps PAC can be obtained by combining the two core sub-streams $C_{00}$ and $C_{10}$ with one of the enhancement sub-streams $C_{01}$ or $C_{11}$. Finally, the combination of all four sub-streams produces a full-rate 128 kbps PAC.

PAC Multi-Stream Transmission Over Time and Frequency

The multi-stream capabilities of the present invention provides reasonable time and frequency diversities. The present invention provides a novel time-frequency distribution of the PAC sub-streams. The present invention is highly robust against various channel impairments and fading conditions. The present invention achieves maximum diversity across both time and frequency dimensions within the allowable bandwidth and time delay using a multi-stream PAC format.

Figure 3:
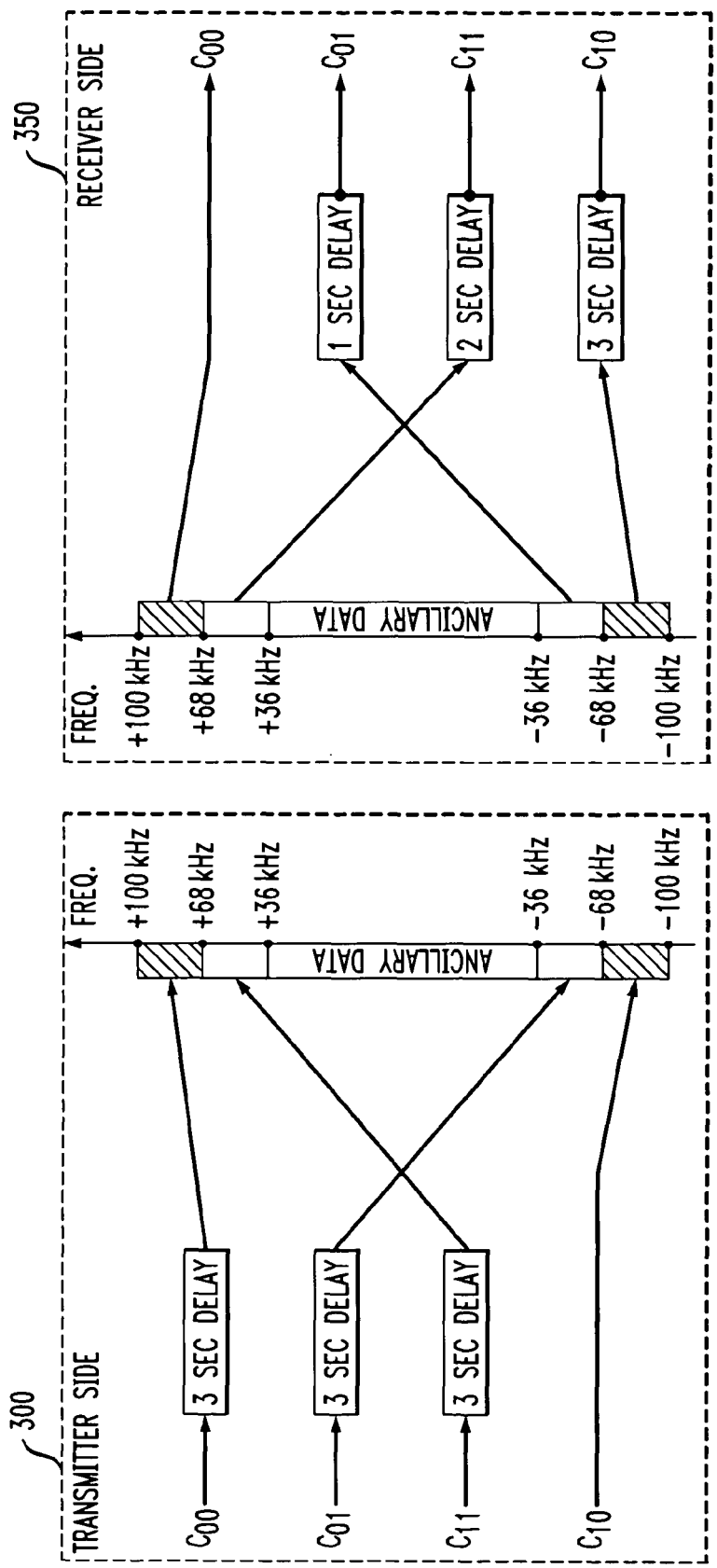
FIG. 3 is a schematic block diagram of a transmitter and receiver in an exemplary all-digital implementation of an IBOC DAB system in which the present invention may be implemented.

FIG. 3 is a schematic block diagram of a transmitter 300 and a receiver 350 in accordance with the present invention in an exemplary all-digital IBOC system. As shown in FIG. 3, the transmitter 300 maps the core sub-stream $C_{10}$ to the lowest 32 kHz frequency partition, whereas the core sub-stream $C_{00}$ is delayed by three (3) seconds and mapped to the highest 32 kHz frequency partition. Similarly, the two enhancement sub-streams $C_{11}$ and $C_{01}$ are time delayed by one or two seconds, respectively, and are then mapped to the two inner 32 kHz frequency partitions, as shown in FIG. 3.

Figure 4:
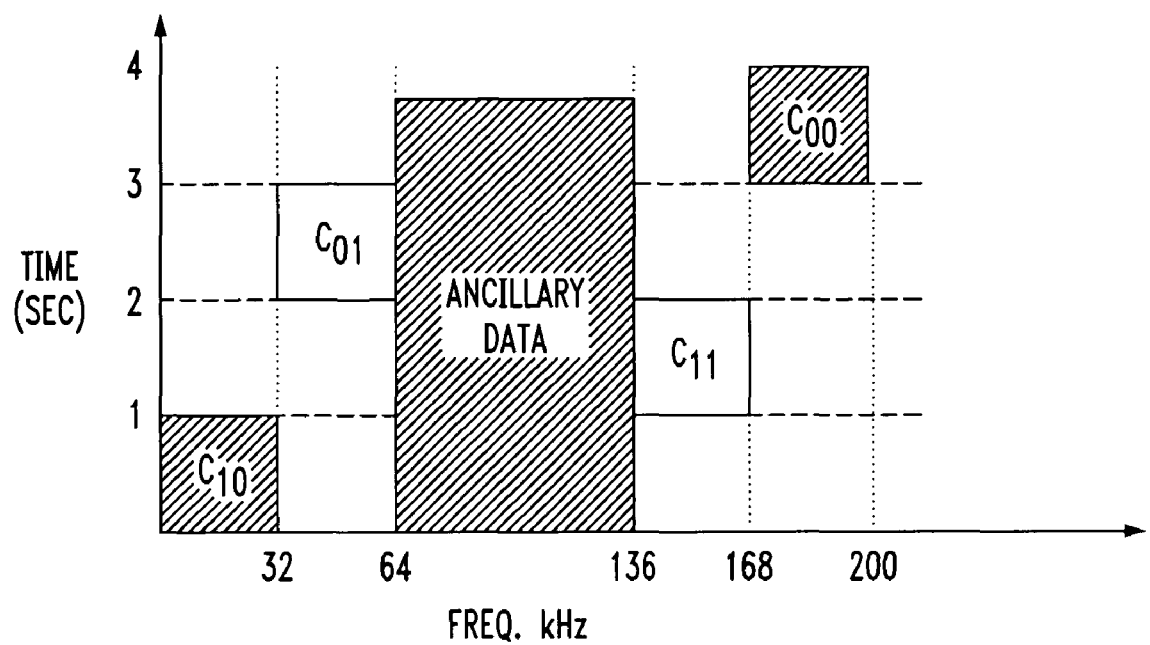
FIG. 4 illustrates the time and frequency diversity of the core and enhancement sub-streams of an audio signal, in accordance with the present invention, in an exemplary all-digital implementation of an IBOC system.

FIG. 4 illustrates a time-frequency representation of the core and enhancement sub-streams associated with an audio signal of one second duration, in accordance with an exemplary all-digital IBOC implementation of the present invention. Thus, as represented in FIG. 4, the core sub-stream $C_{10}$ is transmitted without delay in the first 32 kHz frequency partition.

As shown in FIGS. 3 and 4, the time-frequency allocations of the present invention exhibit the following characteristics. First, the core and enhancement sub-streams are separated by the 72 kHz bandwidth allocated to the data. In addition, no two sub-streams associated with the same audio segment are transmitted in the same time slot. According to a further feature of the present invention, the two core sub-streams $C_{00}$ and $C_{10}$ have maximum possible separation across both the time and frequency axes. Each core sub-stream $C_{00}$ and $C_{10}$ has a 104 kHz frequency separation from one of the enhancement sub-streams in the frequency domain and a two-second separation in the time domain from the other enhancement sub-stream. There is a one second time delay between each core sub-stream and its corresponding enhancement sub-stream.

Thus, the present invention provides maximum diversification of the PAC program across both time and frequency domains within the allocated bandwidth and time delay. The two core sub-streams have the least correlation over both dimensions and it is quite unlikely that they are simultaneously affected by fade or any other channel impairments.

In addition, the present invention provides frequency separations between the core sub-streams and the two enhancement sub-streams in such a way that at least one enhancement can be combined with each core sub-stream depending on the nature of the fade. For example, under low frequency dispersion conditions, the enhancement sub-stream which is separated further in frequency is the best candidate to be combined with the given core sub-stream. However, when the signal suffers from low time dispersion, little frequency diversity is available across the 200 kHz bandwidth and as such, the diversity must be achieved across the time domain.

The receiver 350, shown in FIG. 3, can instantly tune to the 32 kbps core sub-stream $C_{00}$. After the first second, the enhancement sub-stream $C_{01}$ is available and is time-delayed to be aligned with the core sub-stream $C_{00}$ to produce a 64 kbps PAC program. The receiver 350 then waits another two seconds in order to acquire the full 128 kbps PAC audio signal.

It is to be understood that the embodiments and variations shown and described herein are merely illustrative of the principles of this invention and that various modifications may be implemented by those skilled in the art without departing from the scope and spirit of the invention.

We claim:

1. A method of transmitting a plurality of sub-streams in a multi-stream digital audio broadcasting system, said method comprising the steps of:
    allocating a unique frequency partition to each of said sub-streams for a plurality of consecutive time slots;
    allocating a unique time slot to each of said plurality of sub-streams; and
    transmitting said sub-streams to a receiver.

2. The method of claim 1, wherein said sub-streams include at least two core streams and at least two enhancement streams.

3. The method of claim 2, wherein said core sub-streams have a maximum separation in the time domain.

4. The method of claim 2, wherein said multi-stream digital audio broadcasting system is an all-digital IBOC (In-Band-On-Channel) system and said core sub-streams have a maximum separation in the frequency domain.

5. The method of claim 2, wherein said multi-stream digital audio broadcasting system is a hybrid IBOC (In-Band-On-Channel) system and said core sub-streams are transmitted in the frequency domain in the innermost side bands.

6. The method of claim 2, wherein said multi-stream digital audio broadcasting system is an all-digital IBOC (In-Band-On-Channel) system and each of said core sub-streams has a maximum separation from one of said enhancement sub-streams in the frequency domain and a maximum separation from the other enhancement sub-stream in the time domain.

7. The method of claim 2, wherein said multi-stream digital audio broadcasting system is an all-digital IBOC (In-Band-On-Channel) system and said core sub-streams are separated by a data stream.

8. The method of claim 1, wherein no two sub-streams associated with the same audio segment are transmitted in the same time slot.

9. The method of claim 1, wherein a unique time slot is allocated to each of said sub-streams by introducing a delay between each of said sub-streams.

10. A transmitter in a multi-stream digital audio broadcasting system, comprising:
    a modulator for allocating a unique frequency partition to each of two or more sub-streams for a plurality of consecutive time slots;
    a delay circuit for allocating a unique time slot to each of said two or more sub-streams; and
    a transmitter for transmitting said two or more sub-streams to a receiver.

11. The transmitter of claim 10, wherein said two or more sub-streams include at least two core streams and at least two enhancement streams.

12. The transmitter of claim 11, wherein said core sub-streams have a maximum separation in the time domain.

13. The transmitter of claim 11, wherein said multi-stream digital audio broadcasting system is an all-digital IBOC (In-Band-On-Channel) system and said modulator provides a maximum separation of said core sub-streams in the frequency domain.

14. The transmitter of claim 11, wherein said multi-stream digital audio broadcasting system is a hybrid IBOC (In-Band-On-Channel) system and said modulator allocates said core sub-streams in the frequency domain to the innermost side bands.

15. The transmitter of claim 11, wherein said multi-stream digital audio broadcasting system is an all-digital IBOC (In-Band-On-Channel) system and each of said core sub-streams has a maximum separation from one of said enhancement sub-streams in the frequency domain and a maximum separation from the other enhancement sub-stream in the time domain.

16. The transmitter of claim 11, wherein said multi-stream digital audio broadcasting system is an all-digital IBOC (In-Band-On-Channel) system and said core sub-streams are separated by a data stream.

17. The transmitter of claim 10, wherein no two sub-streams associated with the same audio segment are transmitted in the same time slot.

18. The transmitter of claim 10, wherein a unique time slot is allocated to each of said two or more sub-streams by introducing a delay between each of said two or more sub-streams.

* * * * *